United States Patent
Odinak et al.

(10) Patent No.: US 7,551,994 B2
(45) Date of Patent: *Jun. 23, 2009

(54) SYSTEM AND METHOD FOR ADAPTABLE MOBILE USER INTERFACE

(75) Inventors: Gilad Odinak, Bellevue, WA (US); Hakan Kostepen, Escondido, CA (US)

(73) Assignee: Intellist, Inc., Bellevue, WA (US)

( * ) Notice: Subject to any disclaimer, the term of this patent is extended or adjusted under 35 U.S.C. 154(b) by 550 days.

This patent is subject to a terminal disclaimer.

(21) Appl. No.: 10/970,841

(22) Filed: Oct. 20, 2004

(65) Prior Publication Data

US 2005/0143867 A1    Jun. 30, 2005

Related U.S. Application Data

(63) Continuation of application No. 10/454,390, filed on Jun. 3, 2003, now abandoned, which is a continuation of application No. 09/955,475, filed on Sep. 17, 2001, now Pat. No. 6,591,168.

(60) Provisional application No. 60/316,650, filed on Aug. 31, 2001.

(51) Int. Cl.
*G01M 17/00* (2006.01)
*G06F 19/00* (2006.01)

(52) U.S. Cl. ............... 701/35; 340/995.15; 340/995.17; 701/3

(58) Field of Classification Search ............ 701/1, 701/29, 32, 34, 35, 36, 208, 3; 180/313; 280/1; 340/933, 425.5, 500, 999, 995.14, 340/995.15, 990, 995.17; 73/178 R See application file for complete search history.

(56) References Cited

U.S. PATENT DOCUMENTS 3,827,522 A * 8/1974 Krause .................. 180/306

(Continued)

FOREIGN PATENT DOCUMENTS

CN    1856052 A * 11/2006

(Continued)

OTHER PUBLICATIONS

A 2-/spl mu/m CMOS 8-MIPS digital processor with parallel processing capability; Van Wijk, F.J.; van Meerbergen, J.L.; Welten, F.P.; Stoter, J.; Huisken, J.A.; Delaruelle, A.; van Eerdewijk, K.J.E.; Schmid, J.; Wittek, J.H.; Solid-State Circuits, IEEE Journal of; vol. 21, Issue 5, Oct. 1986 pp. 750-765.*

(Continued)

*Primary Examiner*—Cuong H Nguyen
(74) *Attorney, Agent, or Firm*—Black Lowe & Graham PLLC

(57) ABSTRACT

A system, method, and computer program product for automatically adjusting the output of presentation content based upon vehicle conditions. The method determines whether one of a plurality of vehicle conditions exists, such as conditions related to vehicle speed, rate of change in vehicle speed, rate of change in vehicle direction, vehicle emergencies, cellular phone or headphone activation, radar detector activation, noise level decibels above a certain value, etc. The method determines an output format based on the determined vehicle conditions. The method outputs at least a portion of the presentation content based on the determined output format. The determined output format includes display format information, such as text font or icon size information or map detail. The presentation content can also include audio content.

23 Claims, 3 Drawing Sheets

U.S. PATENT DOCUMENTS

| | | | | |
|---|---|---|---|---|
| 4,660,037 | A * | 4/1987 | Nakamura | 340/990 |
| 4,677,561 | A * | 6/1987 | Akama et al. | 701/208 |
| 4,914,605 | A * | 4/1990 | Loughmiller et al. | 345/649 |
| 5,802,492 | A * | 9/1998 | DeLorme et al. | 455/456.5 |
| 5,815,160 | A * | 9/1998 | Kikuchi et al. | 345/661 |
| 5,995,895 | A * | 11/1999 | Watt et al. | 701/50 |
| 6,208,927 | B1 * | 3/2001 | Mine et al. | 701/70 |
| 6,591,168 | B2 * | 7/2003 | Odinak et al. | 701/1 |
| 6,658,344 | B2 * | 12/2003 | Hirasago | 701/96 |
| 6,806,887 | B2 * | 10/2004 | Chernock et al. | 345/629 |
| 6,850,252 | B1 * | 2/2005 | Hoffberg | 715/716 |
| 6,975,932 | B2 * | 12/2005 | Obradovich | 701/96 |
| 2002/0133285 | A1 * | 9/2002 | Hirasago | 701/96 |
| 2002/0171670 | A1 * | 11/2002 | Clernock et al. | 345/629 |
| 2004/0218104 | A1 * | 11/2004 | Smith et al. | 348/734 |
| 2004/0233239 | A1 * | 11/2004 | Lahdesmaki | 345/810 |
| 2005/0052405 | A1 * | 3/2005 | Maulik et al. | 345/156 |
| 2005/0273262 | A1 * | 12/2005 | Kawakami et al. | 701/301 |
| 2006/0015240 | A1 * | 1/2006 | Shima | 701/93 |
| 2006/0015241 | A1 * | 1/2006 | Shima | 701/96 |
| 2006/0164384 | A1 * | 7/2006 | Smith et al. | 345/156 |
| 2006/0206243 | A1 * | 9/2006 | Pawlicki et al. | 701/1 |
| 2007/0005218 | A1 * | 1/2007 | Ueyama | 701/96 |
| 2007/0083819 | A1 * | 4/2007 | Shoemaker | 715/767 |
| 2007/0283263 | A1 * | 12/2007 | Zawde et al. | 715/700 |

FOREIGN PATENT DOCUMENTS

| | | | |
|---|---|---|---|
| JP | | 2006331432 A * | 12/2006 |
| WO | WO 2004099903 A2 * | | 11/2004 |

OTHER PUBLICATIONS

Fuzzy logic speed control and current-harmonic reduction in permanent-magnet brushless AC drives; Shen, J.X.; Zhu, Z.Q.; Howe, D.; Buckley, J.M.; Electric Power Applications, IEE Proceedings—vol. 152, Issue 3, May 6, 2005 pp. 437-446 Digital Object Identifier 10.1049/ip-epa:20040989.*

Voltage distortion effects on insulation systems behaviour in ASD motors; Gustavino, F.; Torrello, E.; Di Lorenzo Del Casale, M.; Egiziano, L.; Electrical Insulation and Dielectric Phenomena, 2003. Annual Report. Conference on; 2003 pp. 608-611 Digital Object Identifier 10.1109/CEIDP.2003.1254928.*

Geo-spatial Tactical Decision Aid systems: fuzzy logic for supporting decision making; Grasso, R.; Giannecchini, S.; Information Fusion, 2006 9th International Conference on, Jul. 10-13, 2006 pp. 1-8; Digital Object Identifier 10.1109/ICIF.2006.301754.*

Research on embedded GIS based on wireless networks; Feixiang Chen; Chongjun Yang; Wenyang Yu; Qimin Cheng; Geoscience and Remote Sensing Symposium, 2004. IGARSS '04. Proceedings. 2004 IEEE International, vol. 5, Sep. 20-24, 2004 pp. 2926-2928 vol. 5; Digital Object Identifier 10.1109/IGARSS.2004.1370307.*

Spatial information integration modes and its key technologies; Feizhou Zhang; Huan Wu; Xiuwan Chen; Min Sun; Yuanhua , Luo; Geoscience and Remote Sensing Symposium, 2004. IGARSS '04. Proceedings. 2004 IEEE International; vol. 4, Sep. 20-24, 2004 pp. 2571-2574 vol. 4; Digital Object Identifier 10.1109/IGARSS.2004. 1369822.*

Smooth navigation of road map in 3D scene; Sun Yi; Zhou Ping; Yang Yijin; Intelligent Transportation Systems, 2003. Proceedings. 2003 IEEE; vol. 2, Oct. 12-15, 2003 pp. 1235-1239 vol. 2.*

Real-time multi-model interpolation of range-varying acoustic propagation; Chin, D.C.; Biondo, A.C.; Information Fusion, 2002. Proceedings of the Fifth International Conference on; vol. 1, Jul. 8-11, 2002 pp. 207-212 vol. 1; Digital Object Identifier 10.1109/ICIF. 2002.1021152.*

Dual neural network models in acoustic propagation; Chin, D.C.; Niondo, A.C.; Simulation Symposium, 2000. (SS 2000) Proceedings. 33rd Annua; Apr. 16-20, 2000 pp. 333-337, Digital Object Identifier 10.1109/SIMSYM.2000.844932.*

Exploring the application of distributed group support systems to distance education;Fellers, J.W.; Moon, D.K.;System Sciences, 1994. vol. IV: Information Systems: Collaboration Technology Organizational Systems and Technology, Proceedings of the Twenty-Seventh Hawaii International Conference on, vol. 4, Jan. 4-7, 1994 pp. 142-148.*

* cited by examiner

US 7,551,994 B2

SYSTEM AND METHOD FOR ADAPTABLE MOBILE USER INTERFACE

PRIORITY CLAIM

This application is a continuation of U.S. application Ser. No. 10/454,390 filed Jun. 3, 2003 now abandoned; which is a continuation of U.S. application Ser. No. 09/955,475 filed Sep. 17, 2001(U.S. Pat. No. 6,591,168 issued Jul. 28, 2003), which claims priority to U.S. Provisional Application Ser. No. 60/316,650 filed Aug. 31, 2001. Each and all of the foregoing applications are incorporated by reference as if fully set forth herein.

FIELD OF THE INVENTION

This invention relates generally to the field of vehicle user interfaces.

BACKGROUND OF THE INVENTION

Various vehicle devices exist that are designed to provide a vehicle operator with travel-related information. For example, a display coupled to a global positioning system (GPS) may be used to present to the vehicle operator a detailed map showing the vehicle location, a desired destination, and the geographic details of the surrounding area. Under certain situations, the vehicle operator has the opportunity to study the map in exact and thorough detail. An example is a parked vehicle. There are other times, however, when the vehicle operator is too busy operating the vehicle to safely view the displayed information, let alone study the displayed information in exacting detail. This is particularly the case where the vehicle operator is in the midst of a particularly taxing circumstance, for example, driving in heavy traffic, driving at high speed, or otherwise distracted by an emergency situation or telephone conversation. In such situations, the display presentation distracts the vehicle operator because the operator focuses attention on the details shown on the display.

Therefore, there exists a need to provide valuable and timely travel-related information to a vehicle operator while minimizing potentially dangerous distractions to the vehicle operator.

SUMMARY OF THE INVENTION

The present invention is a system, method, and computer program product for automatically adjusting the output of presentation content to a user based upon one or more vehicle conditions. The method includes receiving presentation content for output to a vehicle operator or other system user that may include display format information in a particular text font or icon size, map detail, or audio content. The method determines whether one of a plurality of vehicle conditions exists, including conditions related to vehicle speed, rate of change in vehicle speed, rate of change in vehicle direction, vehicle emergencies, cellular phone or headphone activation, radar detector activation, noise level decibels above a certain value, etc. A vehicle emergency condition could indicate events ranging from anti-lock braking system activation to radiator overheating to outside temperature variations that correlate to icy road conditions. The method determines an output format for the presentation content based on the determined vehicle condition. Then, the method outputs at least a portion of the presentation content based on the determined output format.

In accordance with still further aspects of the invention, the content is received from a server over a network link. At least a portion of the network link is a wireless link.

As will be readily appreciated from the foregoing summary, the invention provides a method for automatically adjusting output content based on current vehicle conditions.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention provides a system, method, and computer program product for modulating output over output devices (e.g., display, speakers) based on present vehicle conditions (e.g., speed, rate of change in speed or direction, emergencies). When the system determines that the vehicle requires a more attentive operator, the method of the present invention manipulates the format of information and content presented to the vehicle operator via the output devices.

Figure 1:
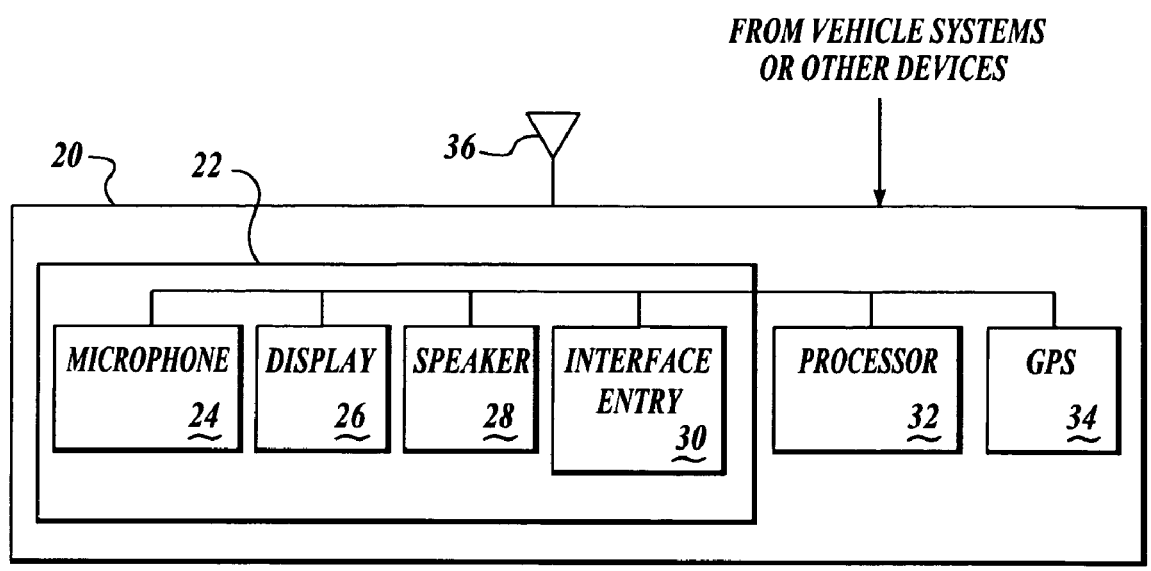
FIG. 1 is a block diagram illustrating the components of the present invention.

FIG. 1 shows a system 20 within a vehicle for performing the present invention. System 20 includes a user interface 22 having a microphone 24 for capturing the user's voice; a display 26; speakers 28; and an interface entry 30 for allowing the user to perform various interactive functions. System 20 also includes a processor 32; a global positioning system (GPS) 34 for determining precise vehicle locations; and a communications device 36, such as a cellular modem, for transmitting and receiving wireless information. System 20 is also coupled to receive information from other vehicle systems (not shown), such as a speedometer, an engine, or a braking system.

Figure 2:
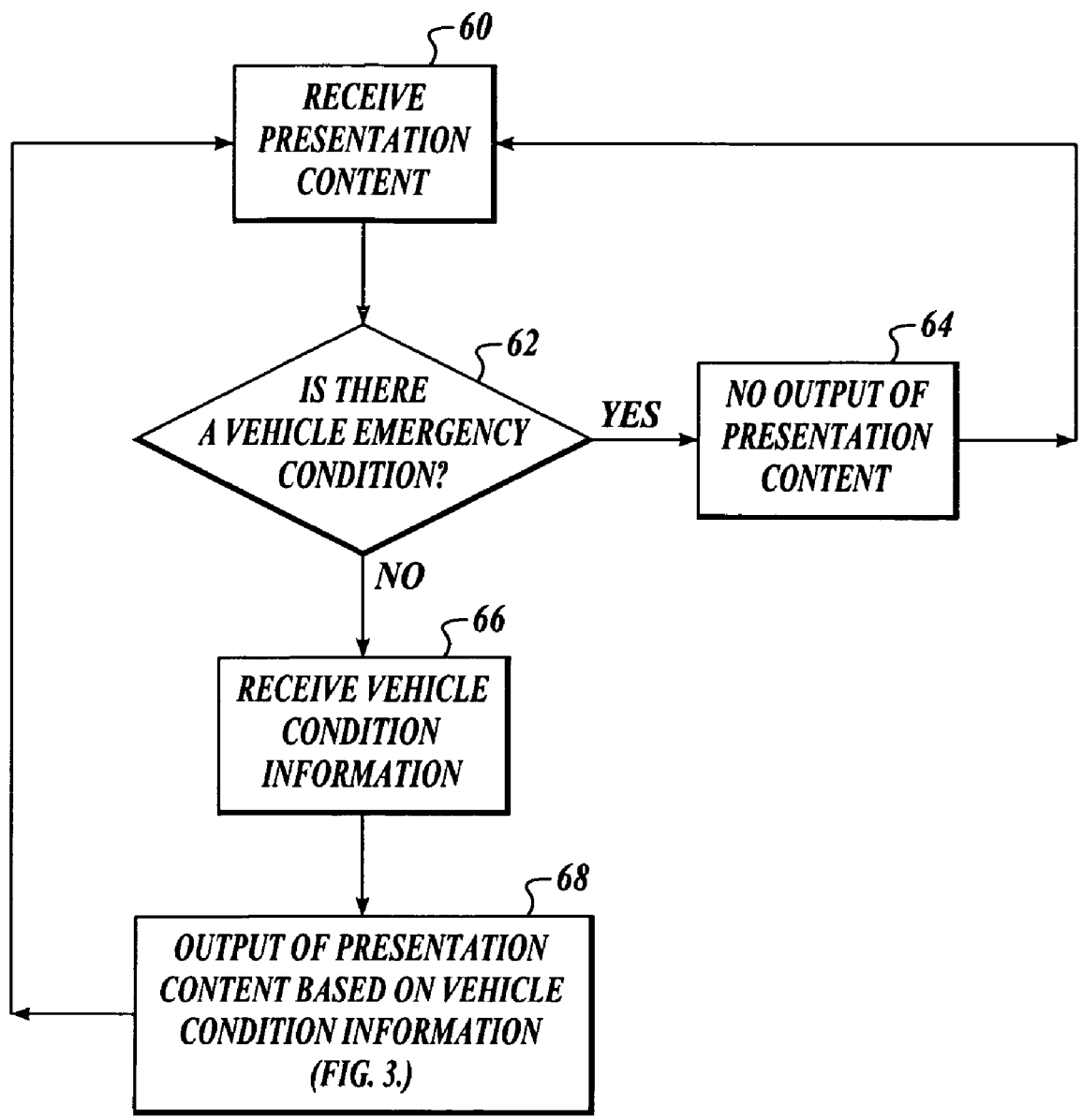
FIG. 2 is a flow chart illustrating the present invention performed by the device shown in FIG. 1.

FIG. 2 illustrates a preferred process performed by system 20 illustrated in FIG. 1. At block 60, system 20 and, more specifically, processor 32, receives presentation content. The presentation content is preferably received at communications device 36 from a server transmitted over a network (not shown). At decision block 62, processor 32 determines if any vehicle emergency condition exists based on information received from the other vehicle systems. If processor 32 determines that a vehicle emergency condition exists, processor 32 stops all output of received presentation content to any one of the components of user interface 22 (block 64). Examples of a vehicle emergency condition that may cause the processor to stop output presentation content to user interface 22 are signals received from the engine that indicate engine overheating or a signal that indicates the operator has applied brakes to the point where an anti-braking system is activated.

Figure 3:
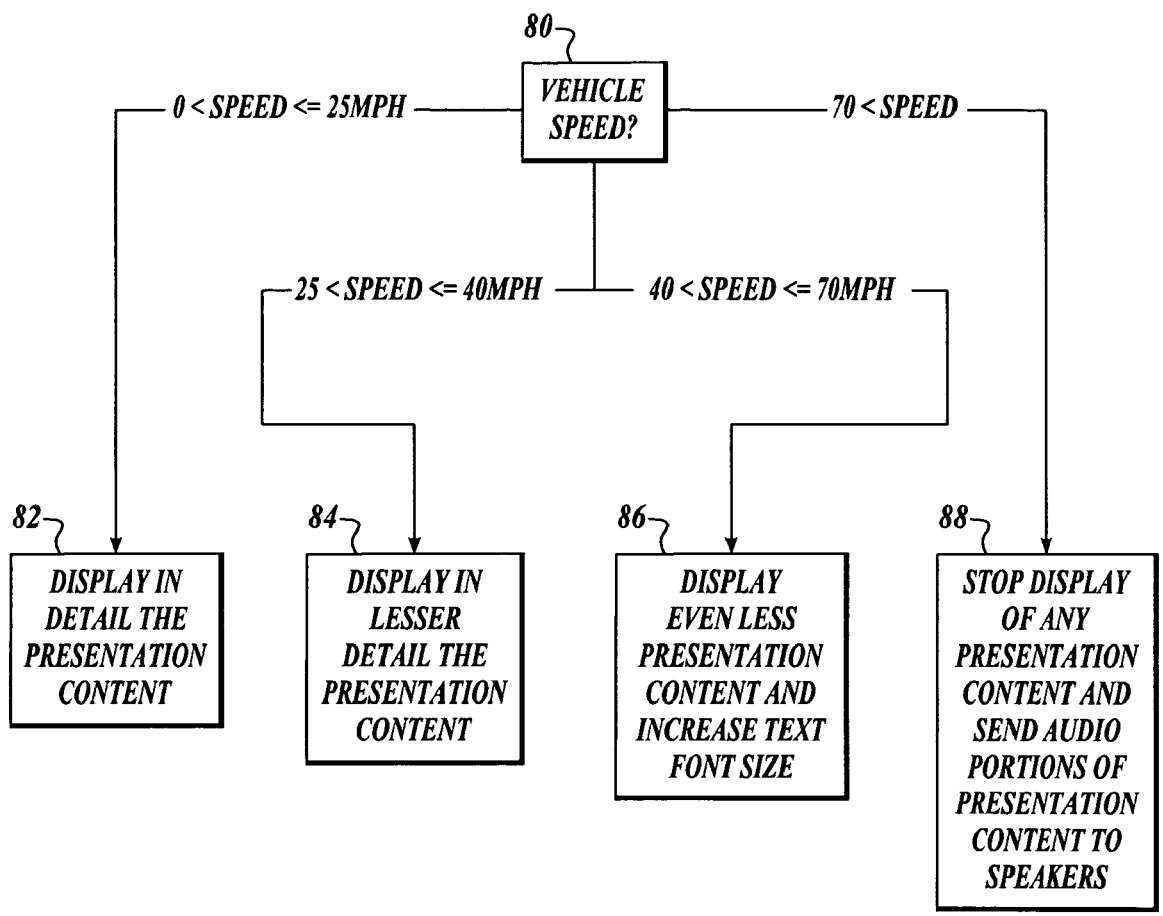
FIG. 3 is a flow chart illustrating the operation of a specific example of the present invention.

If, at decision block 62, processor 32 determines that there is not a vehicle emergency condition, processor 32 receives vehicle condition information (block 66). The vehicle condition information comes from a number of sources that generate signals, such as GPS 34 or a speedometer. At block 68, processor 32 outputs presentation content through user interface 22 based on the vehicle condition information. This step involves determining the substance and format of the presentation content to display on display 26 or broadcast on speakers 28 of user interface 22. For example, when the vehicle is parked, processor 32 presents all or nearly all of the received presentation content. As the vehicle condition changes, for example, the vehicle picks up speed, processor 32 changes the presentation content information that is shown on display 26. The change in presentation content may also involve shifting presentation of information from visual display to audio broadcast as output through speakers 28. In one example, the presented content is a full detailed map of the vehicle's location that includes directions to a previously requested destination. Based on the vehicle speed, or the rate of change in vehicle speed or direction, the detail shown on the map will be altered. As the vehicle speed increases, the detail shown on the map is reduced, for example, to include only the vehicle's present location in relation to nearby streets or intersections. Some or all of the presentation content, or map directions, may be translated to audio format and broadcast to the vehicle operator via speakers 28. In other examples, change in vehicle condition may result in alteration of the font or size of text, icons and graphics presented on the display, as well as increased or decreased audio broadcast. FIG. 3 illustrates an example, based on vehicle speed, of how processor 32 changes the output that is presented over user interface 22.

After blocks 64 and 68, processor 32 returns to block 60 to continue receiving more presentation content. In this embodiment, presentation content is processed in real-time from the time of reception from the server over the network to the output of presentation content to a vehicle operator through user interface 22. In an alternate embodiment, the presentation content can be received all at one time and stored by processor 32 before any determination is made of how to present the output. In another alternate embodiment, if another person other than the vehicle operator wishes to view the presentation content, presented output is set to whatever level of detail is desired.

FIG. 3 illustrates an example of the process performed at block 68 of FIG. 2. At block 80, vehicle speed information is determined, for example by reference to the vehicle speedometer. If the vehicle's speed is less than or equal to 25 mph, processor 32 generates a detailed display to present on display 26 of user interface 22 (block 82). As the speed of the vehicle increases, the amount of detailed visual information generated for display is reduced. Thus, if the vehicle speed is greater than 25 mph but less than or equal to 40 mph, processor 32 generates a display with less visual information than was generated for vehicle speeds of less than or equal to 25 mph (block 84). When the speed is greater than 40 mph but less than or equal to 70 mph, processor 32 reduces not only the amount of detail to be displayed on display 26, but also increases the font size of any text included in the displayed presentation content and changes the color to make it easier for an operator to view (block 86). When the speed is greater than 70 mph, processor 32 stops generating display information for presentation on display 26 and switches to a pure audio presentation for output over the speakers 28 (block 88). The specific speed ranges described are exemplary only. The exact trigger speeds may vary according to various factors, such as road conditions, vehicle specification, vehicle operator skill, etc., as well as user preference. Likewise, the output format of the presentation content may be varied according to user interface hardware or software constraints as well as user preference.

In addition to the example described above with reference to overall vehicle speed, presentation content can be automatically adjusted based upon one or more vehicle conditions related to rate of change in vehicle speed, rate of change in vehicle direction, cellular phone or headphone activation, radar detector activation, noise level decibels above a certain value, radio/CD player in use, TV/DVD console in use, turn signal, etc. The vehicle conditions are determined by vehicle systems, such as the vehicle speedometer, steering, engine, and braking and acceleration systems. Vehicle systems may also include additional components, such as temperature, humidity, wind speed and precipitation gauges, a compass, clock, etc. These additional vehicle system components may be integrated with or separate from system 20, so long as they are capable of being monitored by system 20. The method of the present invention automatically adjusts the output of presentation content based upon a monitor of these vehicle conditions, or a combination of these vehicle conditions. For example, system 20 monitors vehicle braking and acceleration systems with reference to an internal clock to determine the rate of change of vehicle speed. If vehicle speed is increasing or decreasing rapidly, system 20 automatically reduces the amount of detail provided in visual presentation content, and may transfer some or all of the content to audio presentation. In another example, system 20 monitors movement of the steering wheel and vehicle direction with reference to a compass and a clock to determine rate of change of vehicle direction. If vehicle direction is changing rapidly, system 20 would again automatically reduce the amount of detail provided in visual presentation content, as well as transfer some or all of the content to audio presentation.

While the preferred embodiment of the invention has been illustrated and described, as noted above, many changes can be made without departing from the spirit and scope of the invention. For example, as noted above, the trigger event or threshold used to determine the output format for presentation content, as well as the specific output format, might vary according to different factors as well as user preference. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for automatically adjusting output content responsive to one or more vehicle condition, the method comprising:

receiving content for output to a display device associated with the vehicle, the content being configured to enable the display device to graphically illustrate, at a first graphical detail level, the geographic location of the vehicle;

determining a vehicle condition, wherein the condition is at least one of a vehicle speed, a rate of change in vehicle speed, and a rate of change in vehicle direction;

automatically altering, based on the determined vehicle condition, an output format of the illustrated geographic location; and outputting to the display device a graphical illustration, at a second graphical detail level different than the first graphical detail level, of the geographical location of the vehicle based on the altered output format.

2. The method of claim 1, wherein the altered output format comprises display format information.

3. The method of claim 2, wherein the display format information comprises text font size information.

4. The method of claim 2, wherein the display format information comprises icon size information.

5. The method of claim 2, wherein the display format information comprises map detail information.

6. The method of claim 1, wherein the received content comprises audio content.

7. The method of claim 6, further comprising outputting, in response to determining the vehicle condition, at least a portion of the audio content to a speaker device associated with the vehicle.

8. The method of claim 1, wherein determining a vehicle condition comprises determining if the vehicle condition is an emergency.

9. An apparatus for automatically adjusting output content, the apparatus comprising:
a receiver configured to receive, via a wireless signal, content for output;
a user interface comprising at least one presentation device, the content being configured to enable the user interface to graphically illustrate, at a first graphical detail level, the geographic location of the vehicle; and
a processor coupled to the receiver and the user interface, the processor comprising:
a first component configured to determine a vehicle condition, wherein the condition is at least one of a vehicle speed, a rate of change in vehicle speed, and a rate of change in vehicle direction;
a second component configured to automatically alter, based on the determined vehicle condition, an output format of the illustrated geographic location; and
a third component configured to output to the display device a graphical illustration, at a second graphical detail level different than the first graphical detail level, of the geographical location of the vehicle based on the altered output format.

10. The apparatus of claim 9, wherein the determined output format comprises display format information.

11. The apparatus of claim 10, wherein the display format information comprises text font size information.

12. The apparatus of claim 10, wherein the display format information comprises icon size information.

13. The apparatus of claim 10, wherein the display format information comprises map detail information.

14. The apparatus of claim 9, wherein the received content comprises audio content.

15. The apparatus of claim 14, further comprising a fourth component configured to output, in response to determining the vehicle condition, at least a portion of the audio content to a speaker device associated with the vehicle.

16. The apparatus of claim 9, wherein the first component determines if the vehicle condition is an emergency.

17. A computer-readable medium having stored thereon instructions that, when executed by a processing device, enable the processing device to perform a method of automatically adjusting output content, the method comprising:
receiving content for output to a display device associated with a vehicle, the content being configured to enable the display device to graphically illustrate, at a first graphical detail level, the geographic location of the vehicle;
determining a vehicle condition, wherein the condition is at least one of a vehicle speed, a rate of change in vehicle speed, and a rate of change in vehicle direction;
automatically altering, based on the determined vehicle condition, an output format of the illustrated geographic location; and
outputting to the display device a graphical illustration, at a second graphical detail level different than the first graphical detail level, of the geographical location of the vehicle based on the altered output format.

18. The medium of claim 17, wherein the received content comprises audio content.

19. The medium of claim 17, wherein the altered output format comprises display format information.

20. The medium of claim 19, wherein the display format information comprises text font size information.

21. The medium of claim 17, wherein the method further comprises determining if the vehicle condition is an emergency.

22. The medium of claim 19, wherein the display format information comprises icon size information.

23. The medium of claim 19, wherein the display format information comprises map detail information.

* * * * *